May 9, 1961 — M. D'DONA — 2,983,315
STORM DOOR
Filed Aug. 10, 1959 — 3 Sheets-Sheet 3
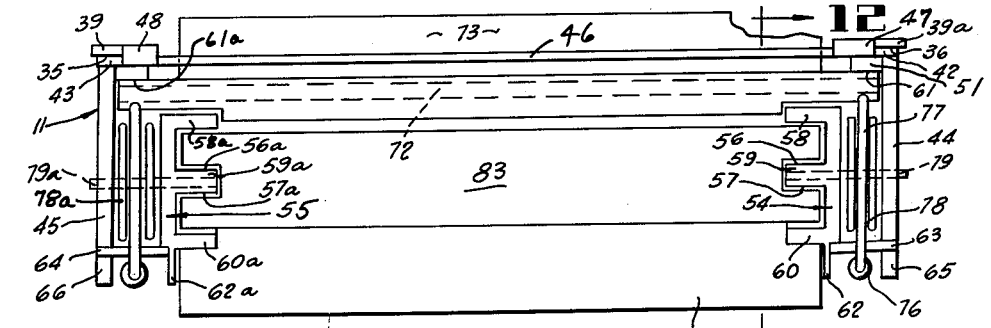
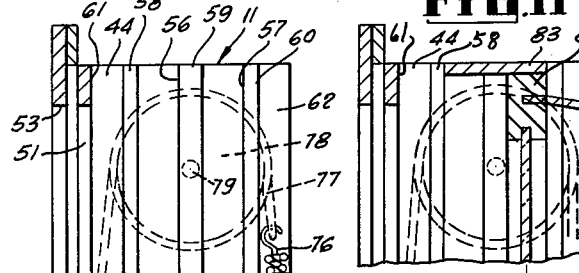
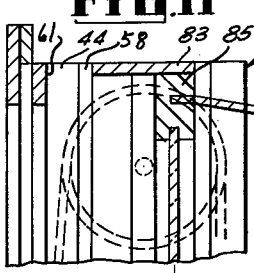
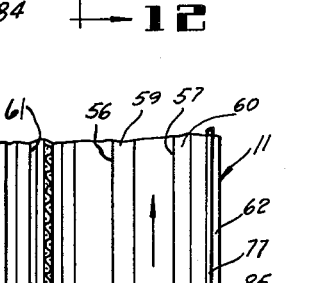
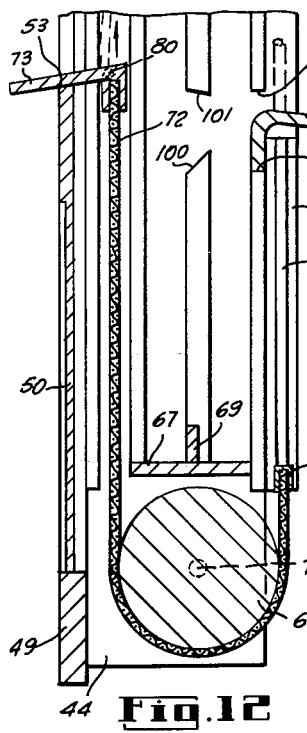
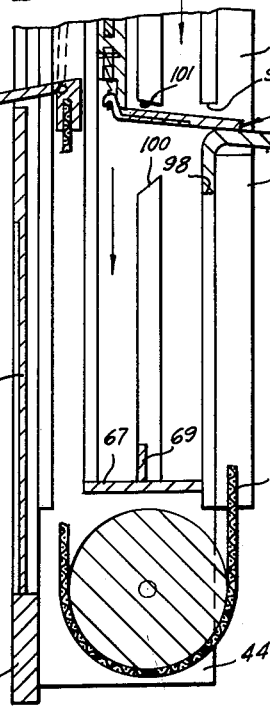
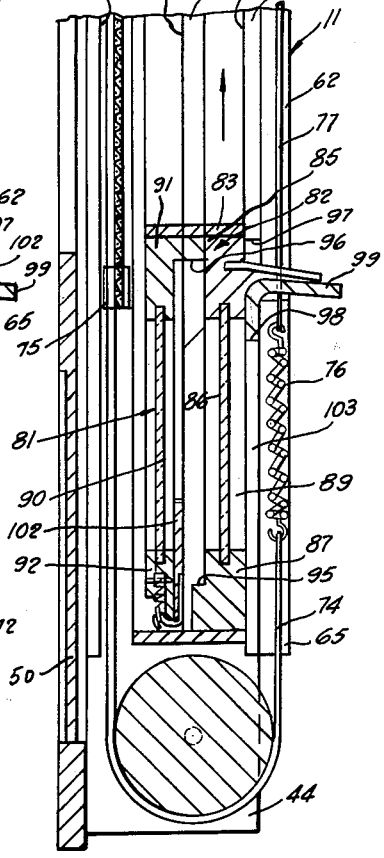
INVENTOR.
MARIO D'DONA
BY Donnelly, Mentag & Harrington
ATTORNEYS

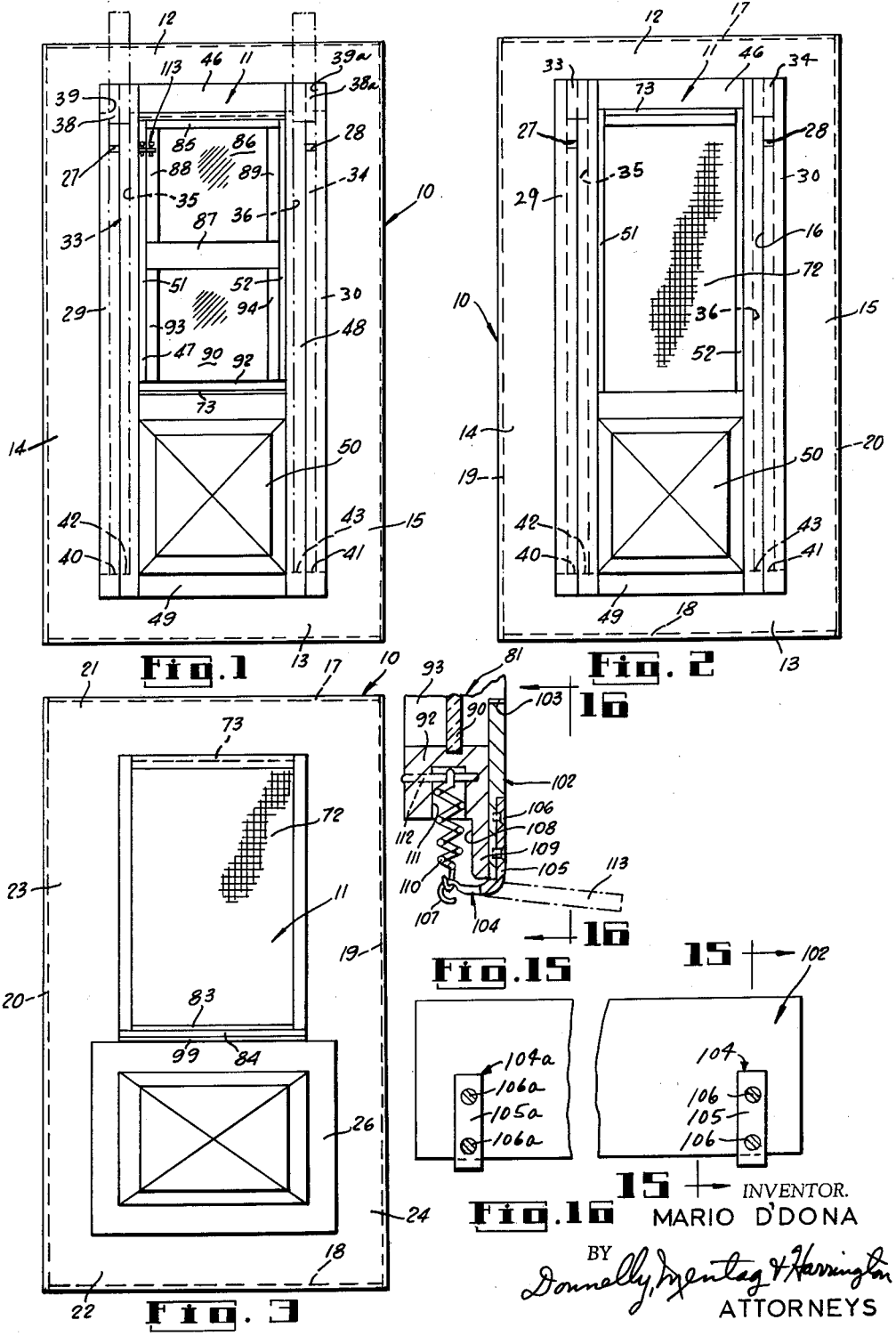

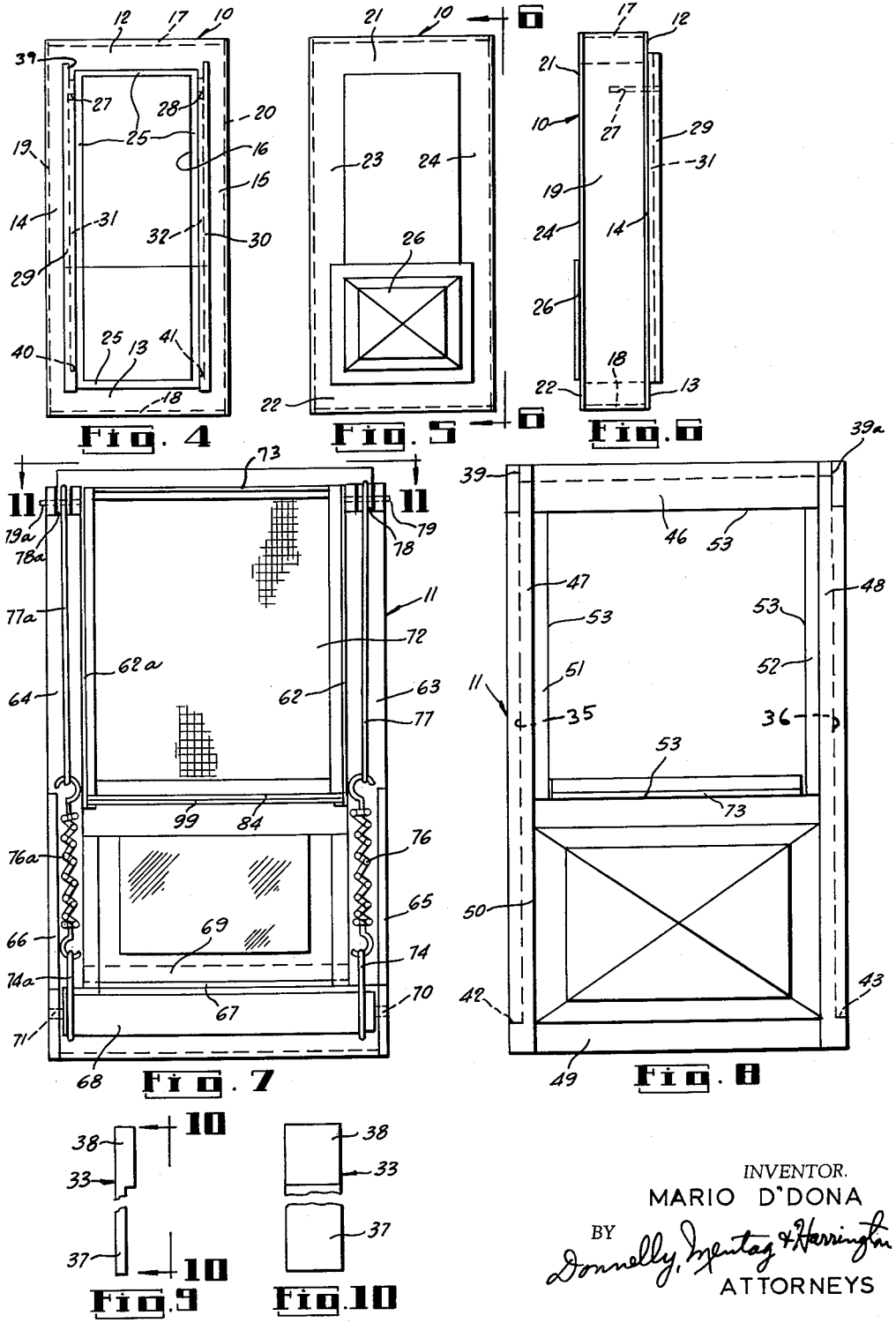

United States Patent Office 2,983,315
Patented May 9, 1961

2,983,315

STORM DOOR

Mario D'Dona, 8550 Dumbarton, Dearborn, Mich.

Filed Aug. 10, 1959, Ser. No. 832,547

4 Claims. (Cl. 160—37)

This invention relates to a combination all-purpose screen and door construction which is arranged and constructed with a removable inner frame which carries the window and screen construction.

It is an important object of the present invention to provide an all-purpose building construction unit which comprises a first frame which may be detachably mounted in a second door or window frame and wherein said first frame is constructed and arrange to carry a plurality of glass panels and a screen for providing an all-purpose window and screen construction adapted for use in either a door or a window of a building.

It is another object of the present invention to provide a combination glass panel and screen construction which will eliminate the need for a separate screen and storm door or screen and storm window.

It is still another object of the present invention to provide a combination glass panel and screen construction which can be converted into either a storm or screen door or window wherein the screen or glass portions not in use are stored within a portion of the construction and wherein a part of the glass panel may be used simultaneously with a part of the screen portion if desired.

It is a still further object of the present invention to provide a combination screen and glass panel door or window construction which is compact and rugged in construction, economical of manufacture, and efficient in operation.

Other objects, features and advantages of this invention will be apparent from the following detailed description and appended claims, reference being had to the accompanying drawings forming a part of the specification wherein like reference numerals designate corresponding parts of the several views.

In the drawings:

Fig. 1 is an inside elevational view of a combination window and screen construction made in accordance with the principles of the invention and showing the glass panels in the use or operative condition and the screen in the down or storage position;

Fig. 2 is an inside elevational view of the structure illustrated in Fig. 1, taken with the window panels down and with the screen portion up or in the operative position;

Fig. 3 is an outside elevational view of the structure illustrated in Fig. 1 with the windows in the down position and the screen in the up or operative position;

Fig. 4 is an inside elevational view of the outer frame or casing employed in the invention to hold the detachable inner frame or casing which carries the window panes and screening material;

Fig. 5 is an outside elevational view of the structure illustrated in Fig. 4;

Fig. 6 is a side elevational view of the structure illustrated in Fig. 5, taken along the line 6—6 thereof, and looking in the direction of the arrows;

Fig. 7 is an outside view of the detachable inner frame or casing which carries the window panes and screening material and showing the window panes down and the screen up;

Fig. 8 is an inside view of the structure illustrated in Fig. 7, and showing the window panes and screen down;

Fig. 9 is a broken side elevational view of one of the retainer strips employed in the invention to secure the inner detachable casing or frame in the outer frame or casing;

Fig. 10 is a broken front elevational view of the structure illustrated in Fig. 9, taken along the line 10—10 thereof, and looking in the direction of the arrows;

Fig. 11 is a top plan view of the structure illustrated in Fig. 7, taken along the line 11—11 thereof, and looking in the direction of the arrows;

Figure 12 is a broken elevational sectional view of the structure illustrated in Fig. 11, taken along the line 12—12 thereof, and looking in the direction of the arrows and with the window sashes removed and the screen in the down position;

Fig. 13 is a broken elevational sectional view, similar to Fig. 12, of the structure illustrated in Fig. 11, and showing the screen down and the window sashes in the up position;

Fig. 14 is a fragmentary elevational sectional view similar to Figs. 12 and 13, and showing the window sashes in the down position and the screen in the up position;

Fig. 15 is a fragmentary elevational sectional view showing the hingedly mounted sill member on the lower end of the lower window sash taken along the line 15—15 of Fig. 16; and, Fig. 16 is a broken elevational view of the hingedly mounted sill member of Fig. 15, taken along the line 16—16 thereof, and looking in the direction of the arrows.

The invention has been illustrated as applied to a storm door, however, it will be seen that the principles of the invention may also be applied to window constructions. Referring now to the drawings, and especially to Figs. 1 through 8, wherein is illustrated a storm door made in accordance with the principles of the invention, the numeral 10 generally indicates a door outer frame or casing which is adapted to detachably carry the inner frame or casing generally indicated by the numeral 11. The inner frame 11 is adapted to carry the window sashes and the screening material, as more fully described hereinafter.

The outer frame 10 may be made solid or hollow as desired. The outer frame 10 is illustrated in the drawings as a hollow construction. As shown in Figs. 1, 2 and 4, the outer frame 10 comprises an inner wall which includes the upper and lower cross rails 12 and 13 and the integral vertical side rails 14 and 15 which cooperate to form the opening 16 for the reception of the inner frame 11. The outer frame 10 further includes the upper and lower end walls 17 and 18 and the vertical side walls 19 and 20 which are fixedly connected by any suitable means to the inner wall formed by the members 12, 13, 14 and 15. The outer surface of the outer frame 10 is formed by the upper and lower cross rails 21 and 22 which are integral with the vertical rails 23 and 24. The members 21, 22, 23 and 24 thus form the outer face of the frame 10 and they overlap the opening 16 along their inner edges to provide a flange 25 which extends around the opening 16 on the outer side thereof as shown in Fig. 4.

The lower end of the opening 16 is enclosed on the outer side thereof by means of the fixedly mounted panel 26 which may be mounted on the outer frame 10 by any suitable means, as by screws, nails or the like. The periphery of the opening 16 is preferably walled in and two inwardly extended slots 27 and 28 are formed in the frame 10 along the upper edge of the opening 16 on opposite sides thereof as shown in Figs. 1, 2, 4 and 6. The openings 27 and 28 are adapted to receive the ends of a pair of pulley shafts as more fully described hereinafter. Fixedly mounted on the inner face of the outer frame 10, along the vertical edges of the opening 16, are the retainer rails 29 and 30 which are provided with the openings 31 and 32 along the inner edges thereof, respectively, for the reception of the retainer strips 33 and 34 as shown in Fig. 1. The retainer strips 33 and 34 are adapted to be partially seated in the openings 31 and 32 of the retainer rails 29 and 30 and also partially seated in the openings 35 and 36 which are formed along the front face of the inner frame 11. As shown in Figs. 9 and 10, the retainer strip 33 is illustrated in an enlarged view and shows the main body of the strip to be substantially rectangular in shape as indicated by the numeral 37. The strip 33 is also provided with the enlarged head 38 which is adapted to be seated in the recess 39 formed in the upper end of the rail 29 and the upper left corner of the inner face of the inner frame 11. The retainer strip 34 is similarly formed and is marked with similar reference numerals followed by the small letter "a." It will be seen that the retainer strips 33 and 34 function to releasably secure the inner frame 11 in the outer frame 10. The inner frame 11 may be easily and quickly removed from the outer frame 10 by merely moving the retainer strips 33 and 34 upwardly until they are completely removed from their respective slots. The openings in the rails 29 and 30 terminate at the points marked 40 and 41, respectively, as shown in Figs. 1 and 4. The lower end of the openings 35 and 36 terminate at the points marked 42 and 43.

As shown in Figs. 7 through 16, the inner frame or casing 11 comprises the vertical side rails 44 and 45 which are fixedly connected along the inner side thereof by the upper cross member or header 46, the vertical side rails 47 and 48 and the lower cross member or header 49. The lower inner face of the inner frame 11 is enclosed by the panel 50 which extends upwardly approximately one-third the height of the inner frame 11. The side rails 47 and 48 are each provided with an inwardly extended portion 51 and 52 as shown in Fig. 8. The lower edge of the upper cross member 46 and the upper edge of the panel 50, and the inner edges of the portions 51 and 52 form an opening for the window sashes and screening member, as indicated by the numeral 53.

As shown in Figs. 11 and 12, the inner frame 11 is further provided with a pair of vertical track forming rails generally indicated by the numerals 54 and 55, and these rails are disposed in a spaced apart inward position from the outer rails 44 and 45. The inner rails 54 and 55 are also spaced apart rearwardly from the inner face of the frame 11. The rails 54 and 55 are substantially E-shaped in cross section so as to form a pair of tracks for the window sashes. As shown in Fig. 11, the rail 54 forms the two inwardly facing sash tracks 56 and 57. The track 56 is formed by the inwardly extended rail walls 58 and 59 and the track 57 is formed by the inwardly extended rail walls 59 and 60. The rail 55 is similarly formed and the parts thereof are marked with similar reference numerals followed by the small letter "a." As shown in Fig. 12, a screen track 61 is formed along the inner side of the frame 11 by means of the track wall 58 and the flange portion 51 of the inner side rail 47. A similar screen track is formed on the other side of the inner frame 11 by means of the similar structure on that side of the frame. The rails 54 and 55 are further provided with the outwardly extended vertical flanges 62 and 62a, respectively, which function to provide an inner wall enclosure for a rope track as shown in Fig. 12.

As shown in Figs. 7 and 11, the inwardly disposed track rails 54 and 55 are fixedly secured in place by means of the vertical plates 63 and 64 which are fixedly connected along the outer edges of the outer rails 44 and 45, and which are also fixedly connected to the outer edges of the inner rails 54 and 55. As shown in Figs. 7 and 11, the inner frame 11 is provided with a pair of fixedly mounted outwardly extended flanges 65 and 66 along the lower outer faces of the plates 63 and 64 so as to form a pair of channel spaces for the ropes for actuating the screening material, as more fully explained hereinafter. As shown in Figs. 7 and 12, the inner rails 54 and 55 terminate at a point above the lower end of the inner frame 11 so as to form a hollow space or chamber in which is operatively mounted the screen roller 68. The lower ends of the rails 54 and 55 are connected by the horizontal cross plate 67 and the vertical cross plate 69. As shown in Figs. 7 and 12, the screen roller 68 is rotatably mounted by means of the shaft 70 which is mounted on one end thereof and which is journalled in the outer rail 44. The other end of the roller 68 is rotatably supported by means of the shaft 71 which is journalled in the other outer side rail 45. As shown in Figs. 7 and 11, a rectangular sheet of suitable screening material 72 is adapted to be passed around the roller 68 and formed along the upper edge of the screening material 72 is the sill member 73.

The screen material 72 is provided with a pair of actuating ropes and pulleys with one rope and pulley being disposed on each side of the frame 11. Accordingly, one of the rope and pulley sets will be described and the other rope and pulley set will be marked with similar reference numerals followed by the small letter "a." As shown in Figs. 11 through 14, the aforementioned rope and pulley means on one side of the inner frame 11 includes the first rope or cable 74 which is attached at its lower end by any suitable means to the cross rail 75 which is fixed to the lower edge of the screen 72. The upper end of the first rope 74 is fixedly connected to the lower end of a suitable coil spring 76 and the upper end of the spring 76 is fixedly connected to the lower end of a second rope or cable 77. The second rope or cable 77 is mounted around the pulley 78 which is rotatably supported on the shaft 79 between the outer rail 44 and the inner rail 54 in the space therebetween and at the upper end of the frame 11. The front end of the rope or cable 77 is fixedly connected to one side of the screen sill 73 as indicated by the numeral 80. It will be seen that the screen material 72 is adapted to be slid upwardly and downwardly in the tracks formed by the inner rail walls 58 and 58a and the outer face flange portions 51 and 52. Fig. 12 shows the screen 72 in a lowered position with the sill 73 resting on the lower edge of the opening 53. In order to move the screen 72 upwardly to the operative or up position the operator merely grasps the sill 73 and moves it upwardly until to engages against the upper side of the upper edge of the opening 53 and assumes the position shown in Fig. 3. The ropes 77 and 74 and the spring 76 will ride upwardly and downwardly in the channel formed by the side walls 62 and 65 and the plate member 63. The ropes and spring on the other side of the screen 72 will move in the channel formed by the member 62a, 65a and the plate 64.

As shown in Figs. 1, 11, 13 and 14, the inner frame 11 is adapted to carry the inner and outer window pane sashes 81 and 82, respectively. The outer window pane sash 82 is provided with the upper cross rail 85 on the upper side of which is fixedly mounted the horizontal cover plate 83. The plate 83 is formed on the side edges thereof, as shown in Fig. 11, so as to ride in the tracks 56 and 57 when the sash 82 is moved upwardly and downwardly. The sash 82 is further provided with the outwardly extended sill 84 which moves upwardly and downwardly with the sash 82. The outer window pane sash 82 includes the window pane 86, the upper cross rail 85, the lower cross rail 87 and the vertical side rails 88 and 89, as shown in Figs. 1 and 14. The window pane sash 82 is slidably mounted in the outer tracks 57 and 57a and may be moved manually upwardly and downwardly from the lowered or down position shown in Fig. 14 to the raised or up position shown in Fig. 13.

The lower window pane sash 81 is slidably mounted in the tracks 56 and 56a and is adapted to be manually moved from the down position shown in Fig. 14 to the up position shown in Fig. 13. The lower window pane sash 81 comprises the window pane 90 which is enclosed by the upper cross rail 91, the lower cross rail 92 and the vertical side rails 93 and 94. As shown in Fig. 14, the lower cross rail 87 of the upper window pane sash 82 is provided with an outwardly extended lip 95 which is adapted to engage the mating lip 96 on the outer face of the upper cross rail 91 of the inner window pane sash 81 when the window pane sash 82 is moved upwardly. It will be seen that when the outer sash 82 is moved upwardly the upwardly facing lip 95 will meet and abut against the downwardly facing lip 96 and the lower sash 81 will be carried upwardly thereby.

As best seen in Figs. 12 through 14, the rail walls 60 are provided with a removed portion between the points 97 and 98 and fixedly mounted in these removed portions is the transversely disposed sill 99. As shown in Figs. 12 and 13, the track portion 59 is provided with a cut-out portion which is bounded on the lower side thereof by the upwardly and outwardly tapered face 100 and on the upper side by the downwardly and outwardly tapered face 101. Hingedly mounted on the lower edge of the lower window sash 81 is the sill 102 which is adapted to extend through the opening in the track portions 59, as more fully described hereinafter. It will be understood that the track portion 59a is also provided with an opening bounded by tapered surfaces as 100 and 101. As shown in Figs. 15 and 16, the lower window sash 81 is provided with a recess 103 along the lower outer edge thereof in which is adapted to be seated the sill member 102 when the sash 81 is in the down position.

Fixedly connected to the lower end of the sill 102 at one end thereof is the L shaped bracket or arm 104 which has one leg thereof as 105 connected to the underside of the sill 102 by means of the screws 106. The inner end of the bracket 104 is provided with the integral hooked portion 107 which is adapted to be rocked inwardly and upwardly into the cut away portion or recess 108 formed on the inner side of the sash rail 92. It will be seen that the bracket 104 thus pivots around the front leg 109 of the sash rail 92. A spring 110 is provided for swinging the bracket 104 and has the lower end thereof connected to the bracket portion or hook 107. The upper end of the spring 110 is fixedly secured in the recess 111 which is formed in the sash rail 92. The spring 110 may be secured in the recess or hole 111 by any suitable means as by means of the pin 112. It will be understood that the other end of the sill 102 is provided with a similar spring biased bracket 104a as illustrated in Fig. 16. If desired, more than 2 spring biased brackets as 104 may be used. It will be seen that the coil springs 110 function to swing the sill 102 downwardly to the dotted position marked by the numeral 113 in Fig. 5 when the sash 81 is in the up position.

On the other hand, the track walls 59 and 59a serve to cam the sill 102 to the inoperative position shown in solid lines in Fig. 15. When the inner sash 81 is in the lowered position shown in Fig. 14 the sill 102 would be cammed into the recess 103 by the walls 59 and 59a, but when the sash 81 is moved upwardly the springs 110 and 110a will rotate the sill 102 into the position shown in Fig. 13. It will be seen in Fig. 13 that when the lower sash 81 is in the up position the sill 102 will bear at its outer end on the fixed sill 99 and on its inner end against the tapered surfaces 101 and the track walls 59 and 59a. It will also be seen that when the lower sash 81 is moved downwardly the tapered surfaces 100 will aid in camming the sill 102 into the recess 103 on the outer face of the sash 81. As shown in Fig. 1, the inner frame 11 may be provided with any suitable latch means, generally indicated by the numeral 114, for retaining the upper sash 82 in the up position. It will be understood that the overlapping lips 95 and 96 function to maintain the lower sash 81 in the up position if the upper sash 82 is secured in the up position by any suitable means. It will be seen also that the outwardly extended ends of the pulley shafts 79 and 79a are adapted to be seated in the notches 27 and 28 which are formed in the outer frame 10 when the frames 10 and 11 are secured together.

It will be seen that the construction of the present invention provides a storm door wherein the window panes and the screen are adapted to be stored in the inner casing 11 and wherein the window panes may be moved upwardly and downwardly independently of the screen 72. It will also be seen that the inner frame or casing 11 may be employed in a screen door as illustrated by the outer frame 10. However, the inner casing 11 may also be used with an outer frame 10 which may form a window for a building instead of a storm door. It will be understood that the construction of the present invention may be made from any suitable material as aluminum, wood and the like. It will be understood that the inner frame 11 may be detachably secured in the outer frame 10 by a suitable means other than the retainer strips 33 and 34.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:

1. In a combination window and screen construction, the combination comprising: an outer frame; an inner frame detachably secured in said outer frame; said inner frame being provided with an opening therethrough; a plurality of window pane sashes slidably mounted in said inner frame for movement to an up position for enclosing said opening and to a down position for storage thereof; a screen slidably mounted in said inner frame for movement to an up position for enclosing said opening and to a down position for storage thereof; means for detachably securing said inner frame in said outer frame; a roller mounted in the bottom end of said inner frame with said screen being mounted therearound; and, means for maintaining said screen in engagement with said roller.

2. The invention as defined in claim 1 wherein: said means for maintaining said screen in engagement with said roller comprises a pair of pulleys mounted in spaced apart positions on the upper end of said inner frame; and, a cable means connected to both ends of said screen at each side thereof and passing around each of said pulleys.

3. In a combination window and screen construction, the combination comprising: an outer frame; an inner frame detachably secured in said outer frame; said inner frame being provided with an opening therethrough; at least a pair of window pane sashes slidably mounted in said inner frame for movement to an up position for enclosing said opening and to a down position for storage thereof; said sashes being provided with inter-engagement means whereby when one of said sashes is moved to the up position, the other sash will be engaged and moved to its up position; a screen slidably mounted in said inner frame for movement to an up position for enclosing said opening and to a down position for storage thereof; and, means for detachably securing said inner frame in said outer frame.

4. In a combination window and screen construction, the combination comprising: an outer frame; an inner frame detachably secured in said outer frame; said inner frame being provided with an opening therethrough; at least a pair of window pane sashes slidably mounted in said inner frame for movement to an up position for enclosing said opening and to a down position for storage thereof; said sashes being provided with inter-engagement means whereby when one of said sashes is moved to the up position, the other sash will be engaged and moved to its up position; a screen slidably mounted in said inner frame for movement to an up position for enclosing said opening and to a down position for storage thereof; means for detachably securing said inner frame in said outer frame; and, said other sash being provided with a hingedly mounted sill on the lower end thereof whereby when this sash is in the up position, the sill will be swung to an operative position, and when this sash is moved to the down position, the sill will be swung to an inoperative position.

References Cited in the file of this patent

UNITED STATES PATENTS

| | | |
|---|---|---|
| 537,109 | Harris et al. | April 9, 1895 |
| 2,923,351 | Zitomer | Feb. 2, 1960 |

FOREIGN PATENTS

| | | |
|---|---|---|
| 24,954 | Great Britain | Nov. 3, 1913 |